3,336,748
PLASMA DEVICE FEED SYSTEM
Shigeo Nakanishi, Berea, and Eugene V. Pawlik, Cleveland, Ohio, assignors to the United States of America as represented by the Administrator of the National Aeronautics and Space Administration
Filed Sept. 8, 1965, Ser. No. 485,957
7 Claims. (Cl. 60—202)

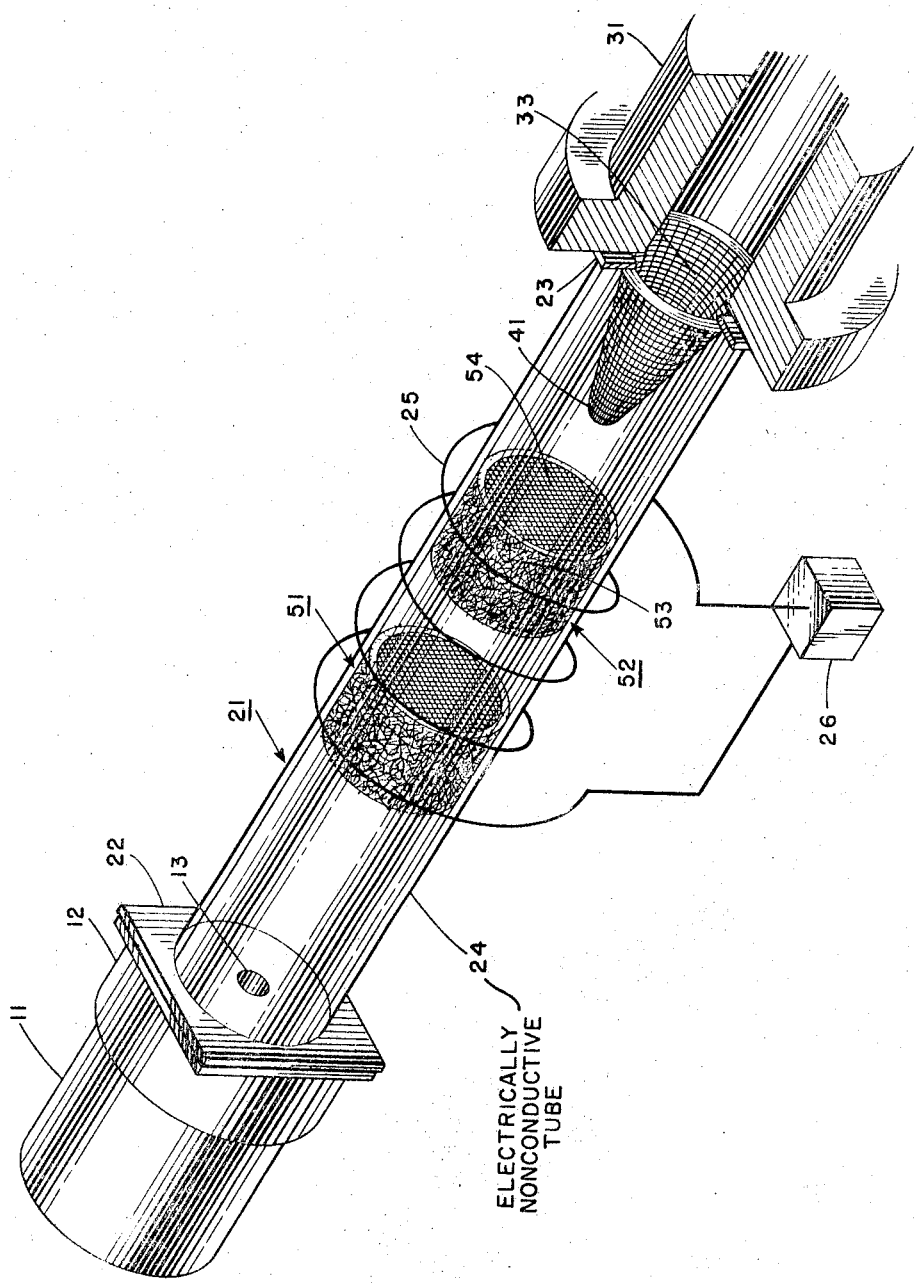

ABSTRACT OF THE DISCLOSURE

A feed system for a plasma thrustor in which the ionization chamber is electrically isolated from the propellant supply source. This isolation is achieved by utilizing an electrically nonconductive tubular member through which the propellant flows from the source to the ionization chamber.

The invention described herein may be manufactured and used by or for the Government of the United States of America for governmental purposes without the payment of any royalties thereon or therefor.

The instant invention relates generally to plasma devices. More particularly, the instant invention relates to a feed system for use in a plasma device of the type wherein a vaporized propellant is transmitted from a source to an ionization chamber. The instant invention is particularly applicable to plasma thrustors, such as disclosed in U.S. Patent No. 3,156,090, magnetic expansion thrustors and other types of plasma devices.

Generally speaking, in a plasma thrustor a propellant fuel supplied from a propellant storage tank is vaporized and then fed into an ionization chamber. In the ionization chamber the vaporized propellant is ionized forming thereby a plasma.

Hitherto, the propellant storage system including the vaporizer unit have been either directly connected or integrally mounted with the ionization chamber. These arrangements have required the propellant supply system to be elevated to the high potential of the ionization chamber which may be in the vicinity of 2000–10,000 volts. With the application of thrustors as a primary propulsion system a multiplicity of modules would be desirable. Sizable quantities of propellant would also have to be inventoried with each unit. With the propellant supply system at this high voltage, a multiplicity of components would be necessary with actuators and sensors floated at the ionization chamber potential.

Accordingly, it is an object of the instant invention to provide for a new and improved thrustor feed system.

It is another object of the instant invention to provide for an improved feed system for use in a plasma device.

It is another object of the instant invention to provide for a new and novel arrangement for connecting a thrustor propellant supply system to a thrustor ionization chamber.

It is still another object of the instant invention to provide for a plasma thrustor wherein the propellant supply system is electrically isolated from the ionization chamber.

It is yet still another object of the instant invention to provide for a plasma thrustor wherein the operation of the ionization chamber may be achieved independently from the operation of the thrustor propellant supply system.

Another object of the instant invention is to provide for an arrangement for separating the propellant supply system from the ionization chamber in a plasma thrustor.

It is still another object of the instant invention to provide for a system whereby a plurality of thrustors may be connected to a single propellant supply system and operated independently from each other.

It is still another object of the instant invention to provide for an electrically, nonconductive conduit assembly for use in transmitting a vaporized propellant from a first location which is at one voltage to another location which is at another voltage.

These and other objects are achieved by means of the instant invention in which a plasma thrustor propellant supply system is in communication with, yet electrically isolated from, a thrustor ionization chamber. To accomplish this, the propellant supply system is separated from the ionization chamber by means of an electrically, nonconductive conduit assembly. Means are provided for within the conduit assembly to prevent the plasma from electrically coupling the ionization chamber to the propellant supply system. The conduit assembly is further provided with heating means. By having the propellant supply system separated from the ionization chamber, a single propellant supply system or reservoir may be used to provide fuel to many units. Consequently, individual modules may be electrically isolated from an array of thrustors in the event of an electrical fault or breakdown in one or more of the units. The instant invention would also ease or simplify the electrical insulation and control problems of a supply system for a single module.

Other objects and many attendant advantages of the present invention will be apparent from the detailed description when taken together with the accompanying drawing which is a simplified perspective view of a plasma device feed system of the instant invention.

Referring now to the drawing there is shown a simplified perspective view of a plasma thrustor feed system which includes a propellant supply chamber or tank 11 adapted to hold a quantity of propellant such as mercury. Surrounding the propellant supply chamber 11 is a vaporizing unit 12 which serves to vaporize the liquid propellant. However, in the event a gaseous propellant is used this vaporizing unit would not be necessary. A conduit assembly 21 connects the supply chamber 11 to a thrustor ionization chamber 31. In operation, propellant from the propellant supply chamber 11 is vaporized and then transmitted via the conduit assembly 21 into the ionization chamber 31. The conduit assembly 21 is connected to openings 13 and 33 in the supply chamber 11 and the ionization chamber 31. Gaskets 22, 23 or other suitable means at these openings provide a gas tight seal to the system.

The conduit assembly 21 includes an electrically insulated tubular member 24 which is connected at one end to the orifice or opening 13 of the supply chamber 11 and at the other end to the opening 33 in the ionization chamber 31. In the embodiment shown, the electrically, nonconductive tubular member 24 is fabricated from glass; however, ceramics or other suitable electrically, nonconductive materials may similarly be used. The diameter of the tubular member 24 should be large enough to accommodate the thrustor propellant usage rate. In an actual embodiment of the invention built and tested the conduit assembly was approximately 30 centimeters long and had a diameter of approximately 5 centimeters. In order to keep the temperature of the conduit assembly above the condensation point of the vapor, heating means in the form of an electric coil 25 powered by a battery 26 are provided. Other suitable heating means could also be employed.

In order to prevent the plasma within the ionization chamber 31 from electrically coupling the ionization chamber 31 to the propellant supply system 11, plasma restraining means are provided for within the conduit assembly 21. Said restraining means includes a plasma containment grid 41 and at least one deionization pad assembly 51.

The plasma containment grid 41 is located close to but not touching the ionization chamber 31 and is fabricated from any suitable electrically conductive material. In the embodiment shown the containment grid 41 is 0.077 millimeter stainless steel wire cloth with a fineness of between 7 and 21 mesh per centimeter. In order to provide for a greater surface area which in turn will cause less of a pressure drop across the grid 41, the grid 41 is preferably in the shape of a cone. The grid 41 is tightly fit within the tube 24. The plasma in the ionization chamber 31 is restrained from coupling up the ionization chamber 31 with the propellant supply tank 11 principally by the small dimensions of the openings in the grid 41 which are less than a sheath thickness fold at the plasma boundaries.

The conduit assembly 21 is further provided with deionization pad assembly means which are located upstream from the containment grid; that is, between the containment grid and the propellant supply unit. Said deionization pad assembly means are in the form of pad assemblies of steel wool or other porous mediums and are mounted in tight fitting relationship in the conduit. In the drawing two of these pad assemblies 51 and 52 are shown. These pad assemblies 51, 52 preferably have a large area to volume ratio in order to quench any plasma which might seep by the containment grid 41. Each of the pad assemblies 51, 52 forms in effect a deionization zone in which charged particles escaping from the containment grid 41 are recombined to form neutral particles. In this recombination process the positively charged particles gain electrons from their environment. The large surface areas of the pad assemblies 51, 52 are relied upon to enhance this process. In the embodiment shown each of the deionization pad assemblies 51, 52 comprises essentially a quantity of medium grade steel wool 53 uniformly packed between circular stainless steel screen retainers 54.

Obviously, many modifications and variations of the present invention are possible in light of the above teachings. It is, therefore, to be understood that within the scope of the appended claims the invention may be practiced other than as specifically described.

What is claimed is:
1. A plasma device feed system comprising
supply means for supplying a quantity of vaporized propellant,
an ionization chamber for ionizing said vaporized propellant,
a tubular member of electrically nonconductive material connected to said supply means and said ionization chamber for carrying said vaporized propellant from said supply means to said ionization chamber,
heating means for maintaining the temperature of the tubular member above the condensation point of the vaporized propellant, and
a plasma restraining grid located within said tubular member for restraining the flow of ionized propellant from the ionization chamber to said supply means.

2. A plasma device feed system comprising
supply means for supplying a quantity of vaporized propellant,
an ionization chamber for ionizing said vaporized propellant,
an electrically nonconductive conduit connected to said supply means and said ionization chamber for carrying said vaporized propellant from said supply means to said ionization chamber, and
a deionization pad assembly located within said conduit for neutralizing plasma particles from said ionization chamber.

3. A plasma device feed system comprising
a source of ionizable gas,
an ionization chamber for ionizing said gas,
an insulating conduit connected to said source and said ionization chamber for carrying said gas from said source to said chamber, and
a conically shaped mesh screen of electrically conductive material within said conduit for restraining the flow of ionized gas from said ionization chamber to said source.

4. A plasma device feed system comprising
a source of ionizable material,
means for ionizing said ionizable material,
a conduit connected to said source and said ionizing means for placing said source in communication with said means, and
a quantity of steel wool disposed between a pair of wire screen discs located within said conduit for restraining the flow of ionized material from said ionizing means to said source.

5. In a propellant feed system for use in an ion thrustor having an ionization chamber with a high electrical potential in which a propellant is ionized, the improvement comprising
a source of gaseous propellant electrically isolated from the ionization chamber,
a conduit having one end in communication with said propellant source and the opposite end in communication with the ionization chamber for transferring the propellant therebetween, and
plasma quenching grid means positioned in said conduit for restraining the flow of ionized propellant from the ionization chamber to said propellant source.

6. The invention according to claim 5 wherein the conduit is glass.

7. The invention according to claim 5 wherein the conduit is ceramic.

References Cited

UNITED STATES PATENTS

| | | | |
|---|---|---|---|
| 3,150,592 | 9/1964 | Stec | 103—1 |
| 3,159,967 | 12/1964 | Webb | 60—202 |
| 3,258,633 | 6/1966 | Swartz | 315—111 X |
| 3,264,508 | 8/1966 | Lai et al. | 313—63 |
| 3,279,176 | 10/1966 | Boden | 60—202 |

CARLTON R. CROYLE, *Primary Examiner.*